United States Patent Office 2,722,501
Patented Nov. 1, 1955

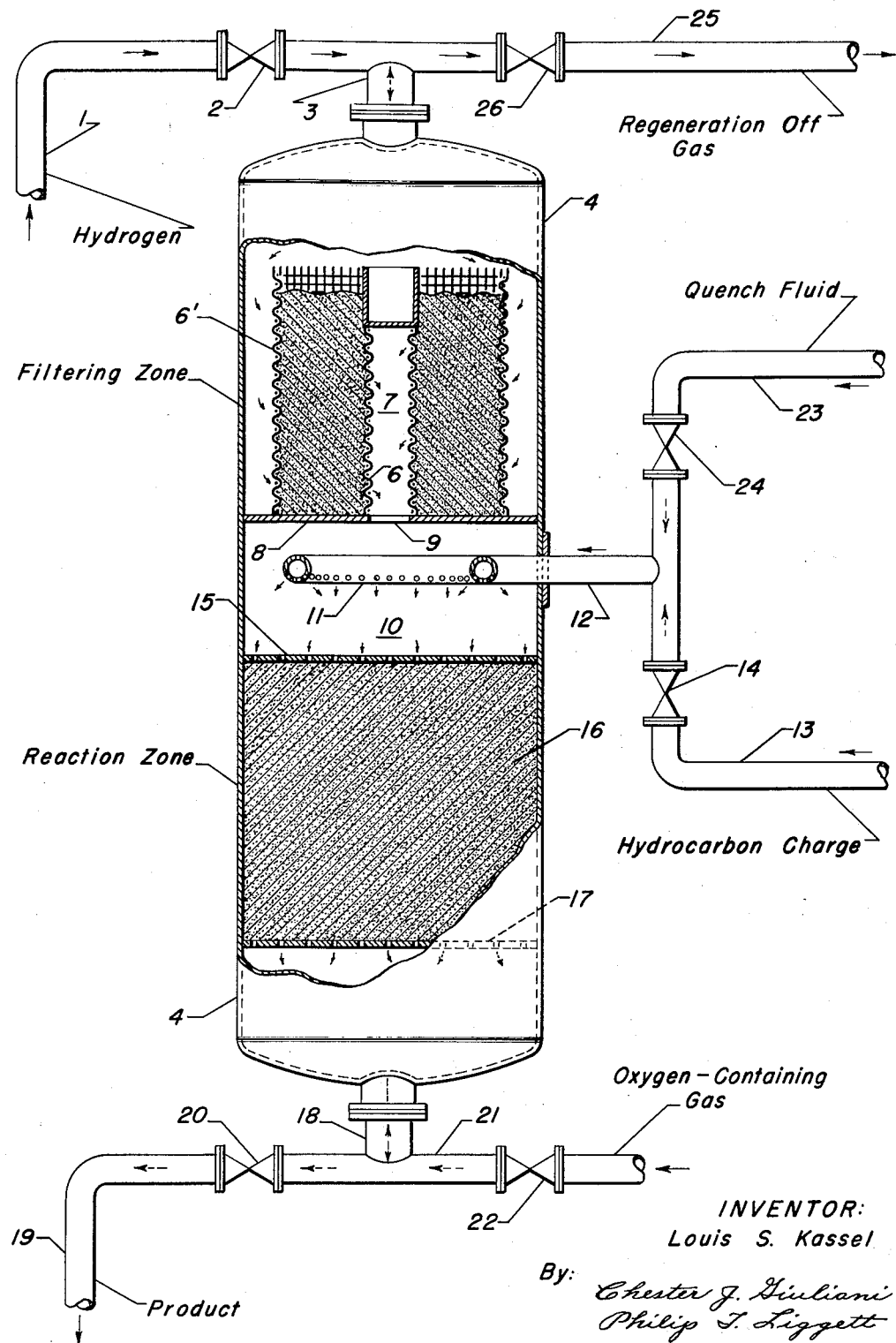

2,722,501

HYDROCARBON CONVERSION PROCESS AND APPARATUS

Louis S. Kassel, Oak Park, Ill., assignor to Universal Oil Products Company, Des Plaines, Ill., a corporation of Delaware Application August 23, 1954, Serial No. 451,471

9 Claims. (Cl. 196—28)

This invention relates to a hydrocarbon conversion process and apparatus and particularly to a means for effecting a regenerative process having the advantage of a radial flow through the catalyst bed.

In ordinary fixed bed catalytic conversion processes, a catalyst bed is maintained in a cylindrical vessel on a suitable plate or grid in a manner such that the catalyst bed occupies the entire cross section area of the vessel. This simple bed has many advantages and is almost universally used unless there are factors present which make its use undesirable. In hydrocarbon conversion processes the use of a simple fixed bed such as that described is frequently undesirable because the upper part of the bed becomes clogged due to the accumulation of scale which is carried into the catalyst bed by the stream of fluid passing therethrough thereby increasing the pressure drop through the bed.

In operations where clogging is severe it has been found that the use of a radial flow bed is advantageous. A radial flow bed is a fixed catalyst bed which is maintained between two concentric screens so that the catalyst bed is an annularly shaped bed of particles maintained concentric to a cylindrical vessel. The material to be converted passes into the upper portion of the cylindrical vessel and into the annulus between the catalyst bed and the vessel wall, and then through the screen that laterally restricts the catalyst bed and into the catalyst bed and eventually through the center screen that maintains an opening in the bed. The material then passes downwardly through an opening in the bottom support plate of the catalyst bed. In some cases the flow may be from the center of the catalyst bed to the outside, however, the former method is preferred since the initial portion of the bed contacted in an out-to-in type flow has a greater surface area and therefore is less restricted by an accumulation of solid material.

Many catalytic conversion processes are operated in a regenerative manner, that is they require removal of an accumulation of carbonaceous material from the particles by burning or other means to restore the activity of the catalyst by uncovering its active surface. When a simple fixed bed of catalyst is regenerated, the ordinary procedure is to discontinue the flow of reactants through the bed and then to pass oxygen-containing gas therethrough with the resultant burning and removal of carbonaceous substances. The regeneration stage is ordinarily effected at a substantially higher temperature than the reaction stage and therefore the vessel expands in diameter and the particulate catalyst maintined therein settles so that the bed is of lesser depth. Upon subsequent cooling when the regeneration is finished and the reaction stage is again being effected, the containing vessel contracts and the catalyst bed, which is unable to return to its former position, is at least partially crushed with the resultant destruction of some of the catalyst particles to make room for the others in the available space. Although this condition is undesirable in that each cycle causes the destruction of a portion of the catalyst, it is tolerable inasmuch as the catalyst life is limiting on the process and catalyst must be periodically replaced due to permanent loss of activity before a substantial amount is lost due to crushing.

When a radial flow process requires regeneration a similar sequence occurs, however, this sequence results in the destruction of the equipment rather than the catalyst. At the end of the reaction stage in a plant using a radial flow bed, the regeneration gases are passed through the bed in the same manner as the reaction fluid and there results a rise in temperature due to combustion. The increased temperature causes the retaining screens to expand and the catalyst bed to settle so that it occupies the greater cross section area. When the regeneration stage has been completed in this process, however, the retaining walls of the catalyst bed, which are not massive pieces of metal but screens, attempt to contract but are prevented by the settled catalyst. The tendency of the screens to expand and contract coupled with the settling catalyst bed destroys the screens. In the case of the outer retaining screen the attempt to contract will cause it to pull apart because the catalyst bed is more resistant to crushing than the screen is resistant to tearing. The inner retaining screen on the other hand will buckle during the regeneration stage because its attempt to expand will be prevented by the encompassing bed of catalyst. It may therefore be seen that the operation of a hydrocarbon conversion process wherein substantial quantities of clogging material are carried in with the process stream and where regeneration is required, is extremely difficult to effect because of the hereinbefore discussed difficulties of catalyst bed clogging on the one hand or equipment destruction on the other. It is an object of this invention to provide a means of gaining the advantage of both types of catalyst beds in a regenerative process.

In one embodiment this invention relates to a method for converting a process stream which comprises passing at least a portion of said process stream horizontally and radially through a bed of solid particles maintained in a filtration zone, passing said process stream downwardly into a reaction zone into contact with a conversion catalyst at conversion conditions, withdrawing the effluent from said reaction zone, discontinuing the flow of reactant stream when said conversion catalyst has become deactivated, passing an oxygen-containing gas upwardly through said conversion zone, introducing quench fluid between said reaction zone and said filtering zone through a distributing means in an amount sufficient to maintain the regeneration off-gas at a temperature not substantially higher than the operating temperature of said filtration zone and withdrawing the mixed stream of quench fluid and regeneration off-gas from the upper portion of said filtration zone.

In another embodiment this invention relates to an apparatus for effecting the conversion which comprises in combination a vertical housing divided into an upper filtering section and a lower reaction section with a fluid introducing and distributing means disposed therebetween, said reaction section containing a catalyst bed supported on a perforated plate, said filtering section containing an annularly shaped bed of solid particles between concentric cylindrical screens disposed axially to said housing and fluid introducing and withdrawing conduit means connected to the upper and lower housing closures.

Briefly, this invention consists of an apparatus and process adapted to avoid the difficulties inherent in regenerative fixed bed processes for converting charge stock which contains bed-clogging material. This process is effected by passing at least a portion of the charge to be converted through a radial flow bed and through a simple downflow fixed bed in series to gain the advantage of radial flow filtration and the regeneratability of a simple downflow fixed bed. During the regeneration stage the downflow fixed bed has oxygen-containing gas pass upwardly therethrough with the resultant rise in temperature, however, between the downflow bed and the radial flow bed there is a fluid distributing means which, during the regeneration period, introduces a quench fluid between the beds so that the radial flow bed may survive the regeneration cycle without having its temperature substantially raised and therefore avoiding the adverse thermal effects of regeneration on this type of bed.

This process is well adapted for use in many hydrocarbon conversion processes including cracking, reforming, isomerization, polymerization, desulfurization, etc. and may be used with many charge stocks such as heavy oils, gas oils, diesel oils, kerosene, gasoline and naphtha, etc. The process and apparatus may also be adapted for high or low temperature conversions or high or low pressure conversions and may be of any desired size. Although this process may be used for any of the above reactions or others it is particularly adapted to hydrocarbon purification processes such as, for example, the desulfurization of gasoline or naphtha and will be explained in connection therewith.

The accompanying drawing is provided to more clearly define the invention and is intended to illustrate rather than limit the invention to the particular operation herein described.

Referring now to the drawing which will be described in relation to a process for converting a hydrocarbon fraction in the presence of a circulating gas and solid particulate catalyst, the circulating gas enters the process through line 1 and valve 2. The gas passes into housing 4 through line 3 maintained in the upper closure of housing 4, and flows into a filtering zone containing a particle bed disposed between screens 6 and 6'. The flow through the particle bed is radial towards center opening 7 and this results in the filtering of the gas stream to remove solid particles of scale, oxides, sulfides, etc. therefrom.

The resultant filtered gas passes from space 7 through opening 9 maintained in the central portion of plate 8 that separates the filtration zone from the rest of the chamber, and descends through the openings maintained in plate 15 of the catalyst bed 16 wherein it contacts a conversion catalyst and the hydrocarbon charge to be converted. The charge to be converted is introduced through line 13 and valve 14 via line 12 into distributing header 11 wherein it is sprayed onto plate 15, descends through the perforations in plate 15 and contacts the catalyst in the catalyst bed 16 in the reaction zone in the presence of the beforementioned gas. The reaction zone is maintained at reaction conditions of temperature and pressure and the total effluent from the reaction zone passes through the perforations in plate 17 which forms the bottom of the reaction zone, and passes through line 18 which connects to line 19 and valve 20. The effluent is passed to whatever subsequent separation and purification stages are desired to recover the desired product.

In the filtration zone the solid particles may be catalytic or non-catalytic in nature and preferably, in this embodiment, are non-catalytic. The particles may comprise any inert solid material such as silica, alumina, silica-alumina, sand, gravel, etc. which is of any suitable particle size selected to perform the desired filtration without excessive pressure drop.

The reaction zone will contain solid particulate catalyst which is adapted to promote the desired reaction. The circulating gas may come from another process and may be at least partially recycled within the conversion process being effected. The effluent from the reaction zone may be separated into a normally liquid and normally gaseous fraction and the normally gaseous fraction may or may not be treated to remove impurities therefrom and then returned to the filtration zone.

As hereinbefore stated, after a certain period of operation the catalyst loses activity due to fouling with carbonaceous deposits hereinafter referred to as coke. The coke covers the catalyst surface and therefore renders it unavailable for promoting reactions and to restore catalytic activity the coke must be removed, preferably by oxidation. In the present process the regeneration is effected by stopping the process flow by closing valves 2 and 14, sealing off the product withdrawal conduit by closing valve 20 and introducing oxygen-containing gas through line 21 and valve 22, then through line 18 and into the lower portion of housing 4. The oxygen-containing gas passes through the perforations in plate 17 and is distributed through the catalyst bed 16 in the reaction zone wherein oxidation of coke is effected. The regeneration off-gas, or the gas resulting from the oxidation of coke, is discharged through the perforations in plate 15 and passes through the centrally located hole in plate 8. Prior to entering zone 7 through the hole 9 in plate 8, the regeneration off-gas is commingled with a quenching fluid introduced through line 23 and valve 24 and then through line 12 to distributor 11. The quench fluid is for the purpose of cooling the regeneration off-gas to a temperature that is equal to or at least not substantially higher than the normal operating temperature of the filtering zone so that there will be no thermal strain in the filtering zone due to the regeneration cycle. The quench fluid may be any inert gas such as cooled flue gas, carbon dioxide, nitrogen, steam or it may be a suitable liquid which is vaporized due to contacting the hot regeneration off-gas.

The cooled mixture of regeneration off-gas and quench fluid passes into space 7 through screens 6 and 6' and the particle bed disposed therebetween and is discharged through conduit 3, conduit 25 and valve 26 to be vented to the atmosphere or otherwise disposed of.

As hereinbefore stated, the process of this invention is particularly suitable for a desulfurization process wherein a hydrocarbon fraction containing combined sulfur is treated to form hydrogen sulfide and the corresponding hydrocarbon. Applying the process of the present invention to desulfurization, hydrogen or hydrogen-containing gas which is preferably recirculated through the system, is introduced through line 1 and valve 2 and enters line 3 and filtration zone 4 wherein it is filtered to remove scale, etc. therefrom by passing through the bed of material maintained between screens 6 and 6'. A resultant purified stream of hydrogen-containing gas passes through space 7, hole 9 and into zone 10 wherein it is commingled with the hydrocarbon to be desulfurized entering the process via lines 13 and 12 and distributor 11. The commingled hydrogen-containing gas and sulfur-containing charge stock pass through grid 15 and enter catalyst bed 16 which contains a desulfurizing catalyst. The desulfurizing catalyst may be any suitable sulfur resistant material that promotes hydrogenation reactions and may include platinum, palladium, iron, cobalt, nickel, chromium, molybdenum, manganese, vanadium, and others or combinations of these either in the form of the metal or as an oxide, sulfide, or salt. The catalytic material may be supported on a suitable carrier which may be inert or may have catalytic promoting qualities and these carriers may comprise silica, alumina, zirconia, magnesia, mixtures of these such as silica-alumina, silica-magnesia, any of which may be promoted with such material as phosphate, halogen, etc. The particularly preferred catalyst for this process is a combination of cobalt-molybdenum supported on alumina which may or may not contain combined halogen.

The desulfurizing zone containing desulfurizing catalyst is preferably maintained at a temperature of from about 350° F. to about 750° F. and at superatmospheric pressure. It is preferred that the pressure be fairly high to promote hydrogenation reactions and is usually in excess of 200 p. s. i.

The effluent resulting from the reaction zone will contain hydrogen, hydrogen sulfide and purified hydrocarbon and the product passing through lines 18 and 19 will generally pass to a separation zone wherein the normally gaseous fraction containing hydrogen and hydrogen sulfide is separated from a substantially sulfur-free liquid fraction. The liquid fraction passes into storage for further processing while the gaseous fraction is preferably treated to remove hydrogen sulfide therefrom and returned to line 1 to repeat the cycle. The hydrogen sulfide may be removed by any suitable means such as absorption in an alkaline solution such as sodium hydroxide, potassium hydroxide, amine solutions or ammonia solutions etc.

When the desulfurizing catalyst has become substantially deactivated the regeneration cycle will be effected in the manner hereinbefore described and it is contemplated for a desulfurizing process that the regeneration cycles will be of comparatively short duration and infrequent since the operating conditions are mild enough to be not conducive to coke formation.

When the charge stock for a desulfurizing process is sufficiently volatile to be largely vaporized in the preheating zone, it may be desirable to introduce the hydrocarbon charge and the hydrogen together through lines 1 and 3 so that both may be filtered. In this case line 12 and distributor 11 will be used exclusively for the introduction of quench fluid so that filtering zone 4 may be maintained at processing conditions during the regeneration cycle and thereby avoiding the hereinbefore described harmful thermal effects.

There may be many modifications of the above described process and apparatus without removing the modified process or apparatus from the broad scope of this invention. Some such modifications include the hereinbefore described introduction of both hydrogen-containing gas and hydrocarbon charge into the upper portion of the filtering zone so that both of these streams may be filtered rather than just one. Another modification may be to remove the regeneration off-gas through a conduit means disposed between the filtering zone and the reaction zone such as distributing header 11, however, it is preferred to use a quench gas both for the purpose of keeping the distributing header cool and unclogged and for the advantage of backwashing the filter. Another modification would include instrumentation such that valves 2, 20 and 14 operate together, that is all open or all closed together, and likewise valves 26, 22 and 24 all operate together. This will prevent the inadvertent distribution of a process stream to the wrong portion of the plant during the wrong cycle of the process. Another modification of the present process might include maintaining a catalyst in the filtering zone so that a portion of the reaction may be effected therein or at least one reaction may be effected therein. As an example of this, if the hydrogen-containing gas used in the process is water gas from a water gas producing process the filtering zone may perform a double function by removing clogging material from the gas stream as well as to shift the equilibrium in favor of high hydrogen composition. To do this the filtering zone must contain a suitable equilibrium shift catalyst. It may also be desirable to maintain a hydrogenating catalyst in the filtering zone to effect a portion of the reaction therein such as, for example, the hydrogenation of nitrogenous material in the feed stock which hydrogenation may be effected at different conditions than the hydrogenation of sulfurous material. It is of course, understood that suitable valves, pumps, compressors, instruments, etc. will be used in the conventional manner and at the conventional points of the plant to control the various temperatures, pressures, flow rates, etc. to be most suitable for the operation. Since these form no part of this invention they will not be discussed in detail other than to say that they are contemplated as being present.

From the foregoing description it may be seen that the process of the present invention provides a means of converting a material in a regenerative fixed bed process whereby the advantages of a simple downflow fixed bed are obtained as well as the advantages of a radial flow fixed bed where heretofore a process of this description was inoperable because of the thermal difficulties encountered.

I claim as my invention:

1. The method for converting a process stream which comprises passing at least a portion of said process stream horizontally and radially through a bed of solid particles maintained in a filtration zone, passing said process stream downwardly into a reaction zone into contact with a conversion catalyst at conversion conditions, withdrawing the effluent from said reaction zone, discontinuing the flow of reactant stream when said conversion catalyst has become deactivated, passing an oxygen-containing gas upwardly through said conversion zone, introducing quench fluid between said reaction zone and said filtering zone through a distributing means in an amount sufficient to maintain the regeneration off-gas at a temperature not substantially higher than the operating temperature of said filtration zone and withdrawing a mixed stream of quench fluid and regeneration off-gas from the upper portion of said filtration zone.

2. A process for converting a hydrocarbon in the presence of a circulating gas stream which comprises passing said gas stream horizontally and radially through a bed of solid particles maintained in a filtration zone, collecting the resultant filtered gas stream and passing it downwardly into a reaction zone into contact with the hydrocarbon to be converted which is introduced above said reaction zone through distributing means in the presence of a conversion catalyst at conversion conditions, withdrawing the effluent from said reaction zone, discontinuing the flow of hydrocarbon and gas when said conversion catalyst has become deactivated and passing oxygen-containing gas upwardly through said reaction zone, introducing quench fluid above said reaction zone through said distributing means in an amount sufficient to maintain the regeneration off-gas at a temperature not substantially higher than the operating temperature of said filtration zone.

3. The process of claim 2 further characterized in that said effluent from said reaction zone is separated into a liquid fraction and a gaseous fraction and said gaseous fraction is at least partially recycled to said filtration zone.

4. The process of desulfurizing a hydrocarbon fraction which comprises passing a circulating hydrogen-containing gas stream horizontally and radially through a bed of solid particles maintained in a filtration zone, collecting the resultant filtered hydrogen stream and passing it downwardly into a reaction zone into contact with said hydrocarbon fraction to be desulfurized which is introduced above said reaction zone through distributing means in the presence of a desulfurizing catalyst at desulfurizing conditions, withdrawing the effluent from said desulfurizing zone and separating it into a liquid fraction and a gaseous fraction, returning said gaseous fraction to said filtration zone, discontinuing the flow of hydrocarbon and hydrogen-containing gas when said desulfurizing catalyst has become deactivated and passing oxygen-containing gas upwardly through said desulfurizing zone, introducing quench fluid above said reaction zone through said distributing means in an amount sufficient to maintain the regeneration off-gas at a temperature not substantially higher than the operating temperature of said filtration zone.

5. The process of claim 4 further characterized in that the hydrogen-containing gas recycled to said filtration zone is treated to remove hydrogen sulfide therefrom.

6. The process of claim 4 further characterized in that said desulfurizing catalyst comprises cobalt, molybdenum and alumina.

7. The process of claim 4 further characterized in that said desulfurizing zone is maintained at a temperature of from about 350° F. to about 750° F. and a pressure in excess of 200 p. s. i.

8. The process of desulfurizing a hydrocarbon in the presence of a hydrogen-containing gas which comprises commingling said hydrocarbon and hydrogen-containing gas and passing the resultant process stream horizontally and radially through a bed of solid particles maintained in a filtration zone, passing the resultant filtered stream downwardly into a reaction zone into contact with desulfurizing catalyst maintained at desulfurizing conditions, withdrawing the effluent from said desulfurizing zone, discontinuing the flow of hydrocarbon and gas when said desulfurizing catalyst has become deactivated and passing oxygen-containing gas upwardly through said desulfurizing zone, introducing quench fluid above said desulfurizing zone through a distributing means maintained between said desulfurizing zone and said filtering zone in an amount sufficient to maintain the regeneration off-gas at a temperature not substantially higher than the operating temperature of said filtering zone.

9. An apparatus for effecting a catalytic conversion which comprises in combination a vertical housing divided into an upper filtering section and a lower reaction section, fluid introducing and distributing means disposed between said sections, said reaction section containing a catalyst bed between upper and lower perforate plates, said filtering section containing an annularly shaped bed of solid particles between concentric cylindrical perforate members disposed axially to said housing and fluid introducing and withdrawing conduit means connected to the upper and lower housing closures.

References Cited in the file of this patent

UNITED STATES PATENTS

| | | |
|---|---|---|
| 1,895,063 | Zurcher | Jan. 24, 1933 |
| 2,187,741 | Houdry | Jan. 23, 1940 |
| 2,319,620 | Mather | May 18, 1943 |
| 2,475,822 | Cummings | July 12, 1949 |
| 2,512,562 | Cummings | June 20, 1950 |